United States Patent
Morenko et al.

(10) Patent No.: US 8,443,515 B2
(45) Date of Patent: May 21, 2013

(54) WELDED GAS TURBINE ENGINE PARTS WITH DIFFERENT THICKNESSES AND METHOD

(75) Inventors: Oleg Morenko, Oakville (CA); Lorin Markarian, Etobicoke (CA); Bhawan B. Patel, Mississauga (CA)

(73) Assignee: Pratt & Whitney Canada Corp., Longueuil (CA)

( * ) Notice: Subject to any disclaimer, the term of this patent is extended or adjusted under 35 U.S.C. 154(b) by 840 days.

(21) Appl. No.: 11/513,228

(22) Filed: Aug. 31, 2006

(65) Prior Publication Data

US 2008/0053098 A1    Mar. 6, 2008

(51) Int. Cl.
*B21K 25/00*    (2006.01)
*B23P 15/04*    (2006.01)

(52) U.S. Cl.
USPC .......................... 29/889.2; 29/525.14; 60/752

(58) Field of Classification Search ............. 219/121.63; 60/752–760; 29/890.02, 889.2, 889, 428, 29/557
See application file for complete search history.

(56) References Cited

U.S. PATENT DOCUMENTS

| 4,206,865 | A | * | 6/1980 | Miller | 228/152 |
|---|---|---|---|---|---|
| 4,923,007 | A | * | 5/1990 | Sanford et al. | 277/334 |
| 5,433,370 | A | * | 7/1995 | Halling | 228/155 |
| 6,032,361 | A | * | 3/2000 | Makino et al. | 29/889.2 |
| 6,427,446 | B1 | * | 8/2002 | Kraft et al. | 60/737 |
| 6,651,437 | B2 | * | 11/2003 | Farmer et al. | 60/752 |

* cited by examiner

*Primary Examiner* — Phutthiwat Wongwian
*Assistant Examiner* — Craig Kim
(74) *Attorney, Agent, or Firm* — Norton Rose Canada LLP

(57) ABSTRACT

A welded part comprises a first detail and a second detail at least partially overlapping the first detail in an overlapping zone. A pair of side-by-side weld seams is provided in the overlapping zone to form a part suited for used in a gas turbine engine with the first and second details.

13 Claims, 2 Drawing Sheets

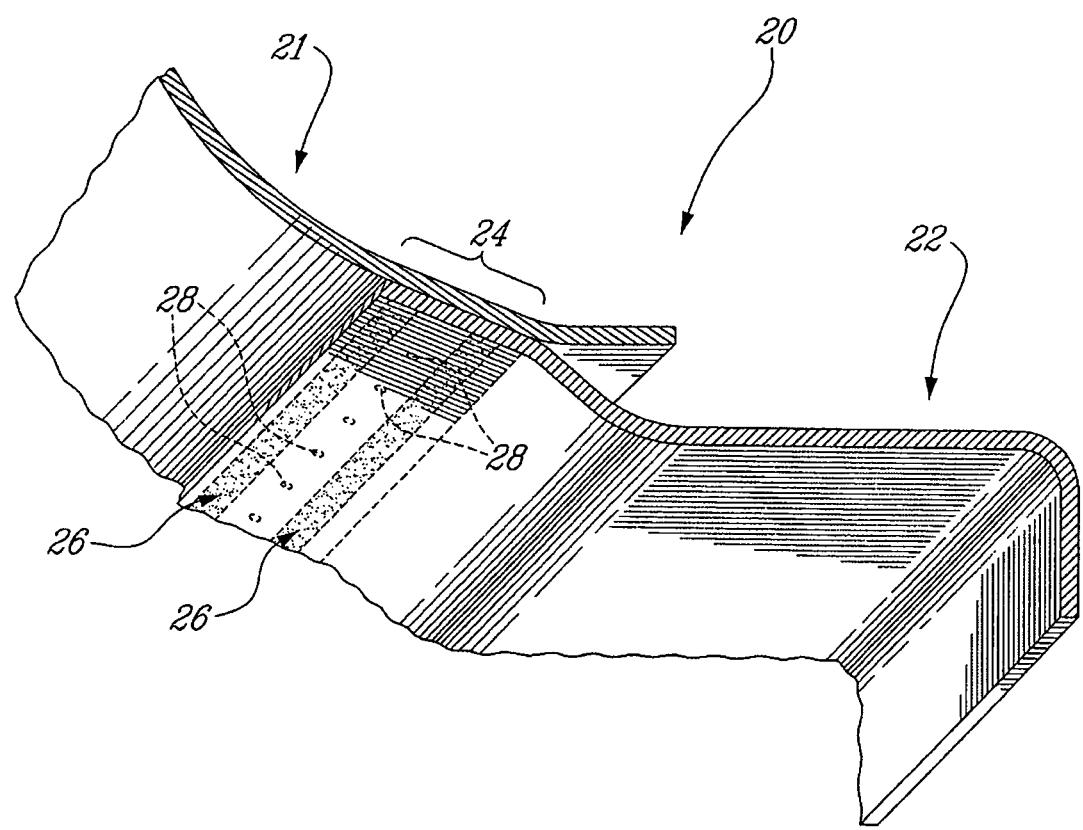

WELDED GAS TURBINE ENGINE PARTS WITH DIFFERENT THICKNESSES AND METHOD

TECHNICAL FIELD

The present invention relates generally to gas turbine engines, and more particularly to an improved welded gas turbine engine part and method therefor.

BACKGROUND OF THE INVENTION

In gas turbine engines, when two pieces of sheet metal of substantially different thickness are overlapped for welding, the quality of the weld is poor. The penetration of weld from thin sheet metal to thick sheet metal is not satisfactory, causing poor quality welds. Due to the design requirements (e.g., stiffness, weight, etc. . . . ), it is not always possible to thicken up or thin down a piece of sheet metal forming a part of the engine. Alternative methods of producing a part with varying thicknesses along the part, such as flow forming a detail, are costly.

Accordingly, there is a need to provide an improved welded engine part and method which addresses these and other limitations of the prior art, and it is therefore an object of this invention to do so.

SUMMARY OF THE INVENTION

In accordance with a first aspect of the present invention, there is provided a gas turbine engine combustor liner comprising a first sheet metal detail, a second sheet metal detail partially overlapping the first sheet metal detail so as to define a joint area, the first and second sheet metal details having dissimilar thicknesses at said joint area, and first and second spaced-apart weld seams in the joint area.

In accordance with another general aspect of the present invention, there is provided a method of joining two combustor liner parts having different thicknesses, comprising overlapping a first liner part with a second liner part so as to form an overlapping zone; performing a first weld seam in the overlapping zone; and performing a second weld seam in the overlapping zone in spaced-apart relation with the first weld seam.

Further details of these and other aspects of the present invention will be apparent from the detailed description and Figures included below.

BRIEF DESCRIPTION OF THE DRAWINGS

Reference is now made to the accompanying Figures depicting aspects of the present invention, in which:

FIG. 2 is a partially sectioned perspective schematic of the engine welded part.

DETAILED DESCRIPTION OF THE PREFERRED EMBODIMENT

Figure 1:
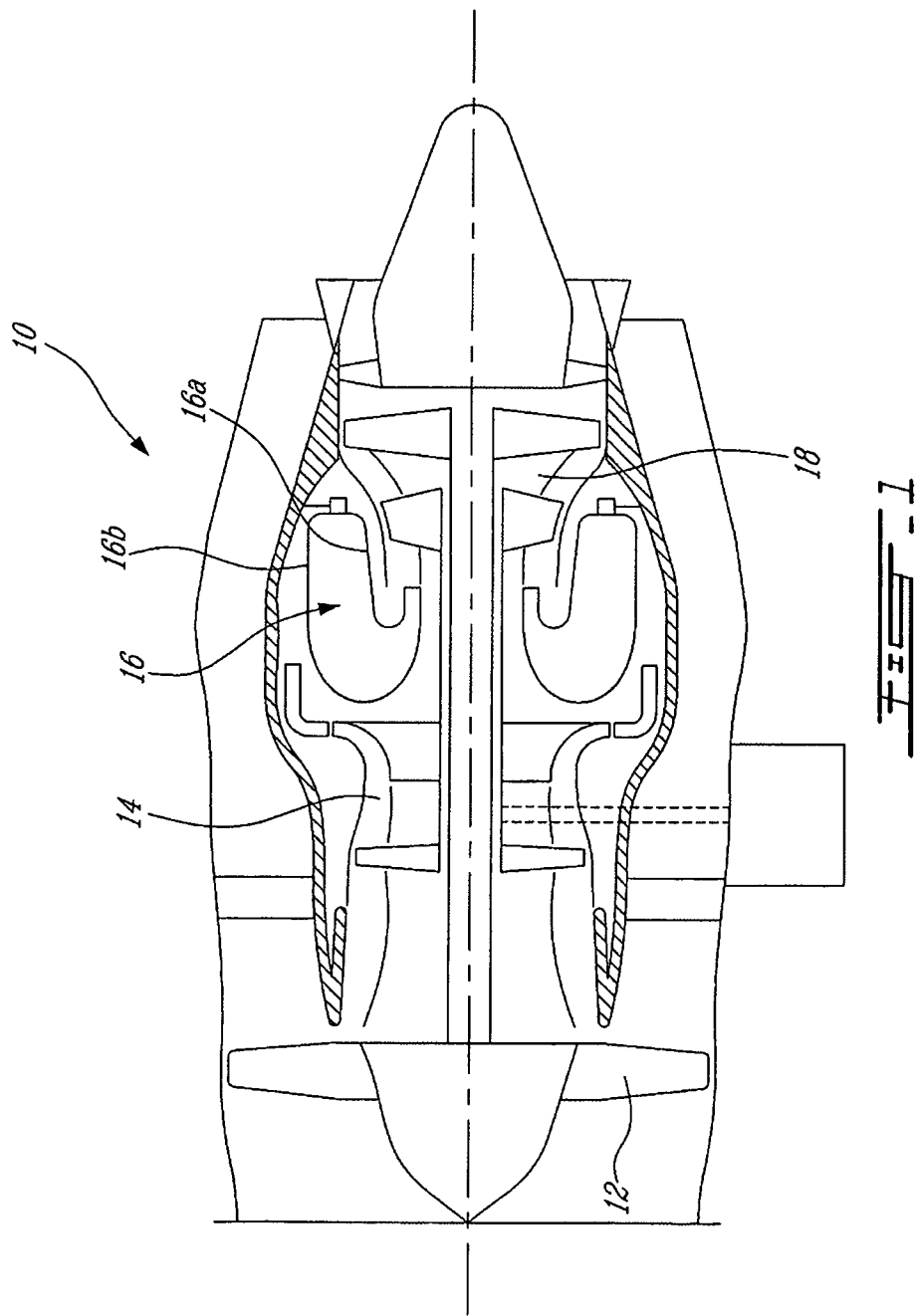
FIG. 1 is a partially-sectioned side view schematic of a gas turbine engine having a welded part in accordance with an embodiment of the present invention.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

In FIG. 1, the gas turbine engine 10 has a plurality of parts made of sheet metal. For instance, the combustor 16 typically includes sheet metal inner and outer liners 16a and 16b assembled together about a central axis of the engine to form the annular combustor shell. Such sheet metal parts are frequently made by the welding of a set of sheet metal pieces, also known as details.

Referring to FIG. 2, a portion of the engine combustor liner is generally shown at 20 and has a first annular detail 21 and a second axially adjacent annular detail 22, defining an overlapping zone 24. The first detail 21 is relatively thicker than the second detail 22. As an example, the first detail 21 is made of sheet metal ranging in thickness between 0.051" and 0.056" stock, whereas the first detail is made of sheet metal ranging in thickness between 0.027" and 0.031" stock.

A suitable type of fusion welding, such as laser penetration welding, is used to weld the first detail 21 to the second detail 22 in the overlapping zone 24. To avoid melt down of the thin sheet metal, less energy is used in the laser welding, causing a relatively narrow weld seam fusion zone. The narrow weld seam fusion zone has a width ranging from about 0.010" to about 0.050". Such a narrow fusion zone is not acceptable for structure strength. To meet the structural strength and durability requirement at least two laser seams 26 are done in a laterally spaced-apart relationship. A wide fusion zone would induce large deformation and lack full penetration due to the required higher thickness ratios and is thus not suitable. Thin weld seams allow obtaining the required weld surface quality when welding a thin part to a thicker part.

Initially, the annular details 21 and 22 are axially aligned in overlapping relationship so as to form a lap joint therebetween and tack welded together to minimise the gap between the details 21 and 22. A laser beam is projected on the details 21 and 22 from one side thereof at the location of seam weld shown in FIG. 2, while the part assembly rotate along a central axis thereof. This produces a first uniform circumferential continuous seam weld 26 by local metal melting to create a thin fusion zone between the two details 21 and 22. The laser energy is calibrated so as to produce local metal melting without splattering the metal and/or deformation. A second circumferential seam weld 26 is produced after completion of first seam weld 26 so as to form an axial gap between the two seam welds 26. Holes 28 are optionally provided between the weld seams 26 in the thin sheet detail 22 for ventilation during the welding operation. Holes 28 ventilate the cavity formed between the two seam welds 26 and the adjoining surfaces of the details 21 and 22. Laser strike for welding can be done either side, provided the laser beam energy is adjusted to suit the material thickness. Preference for the laser strike is on the thinner part. An increase in overall fusion surface results from the combination of weld seams 26 as opposed to the presence of a single weld seam 26.

The combination of the two weld seams 26 is performed in order to meet structural strength and durability requirements for the part 20. It is considered to provide additional weld seams to increase the overall fusion surface between the first detail 21 and the second detail 22 in the overlapping zone 24.

The above description is meant to be exemplary only, and one skilled in the art will recognize that changes may be made to the embodiments described without departing from the scope of the invention disclosed. For instance, other types of fusion welding capable of producing narrow fusion zones while ensuring complete penetration could be used as well. Still other modifications which fall within the scope of the present invention will be apparent to those skilled in the art, in light of a review of this disclosure, and such modifications are intended to fall within the equivalents accorded to the appended claims.

The invention claimed is:

1. A gas turbine engine combustor liner comprising a first sheet metal detail of the combustor liner, a second sheet metal detail of the combustor liner partially overlapping the first sheet metal detail so as to define a joint area, the first and second sheet metal details having dissimilar thicknesses at said joint area at a ratio ranging between 1.65 and 2.07 between a thickness of the first sheet metal detail and a thickness of the second sheet metal detail, and first and second spaced-apart weld seams in the joint area defining a gap therebetween.

2. The combustor liner defined in claim 1, wherein the first weld seam and the second weld seam are axially spaced-apart.

3. The combustor liner defined in claim 1, wherein the first sheet metal detail has a thickness ranging between 0.051" and 0.056" and the second sheet metal detail has a thickness ranging between 0.027" and 0.031".

4. The combustor liner defined in claim 1, wherein the second sheet metal detail is thinner than the first sheet metal detail, and wherein the ventilation holes are defined in the second sheet metal detail.

5. The combustor liner defined in claim 4, wherein the first and the second weld seams have a width ranging from about 0.010" to about 0.050", the first and second weld seams extend circumferentially about a central axis of the combustor liner and are axially spaced-apart.

6. The combustor liner defined in claim 1, further comprising a plurality of spaced-apart ventilation holes axially centrally positioned between the first weld seam and the second weld seam.

7. A method of joining two combustor liner parts having different thicknesses, comprising overlapping a first annular combustor liner part with a second annular combustor liner part so as to form an overlapping zone being annular in which overlapping zone a ratio between a thickness of a first liner part and a thickness of a second liner part is between 1.65 and 2.07; performing a first weld seam in the overlapping zone; performing a second weld seam in the overlapping zone in spaced-apart relation with the first weld seam with the ventilation holes centrally positioned between the first weld seam and the second weld seam, the first and second weld seams both securing solely the first linear part to the second linear part defining a gap therebetween.

8. The method defined in claim 7, wherein the steps of performing weld seams are performed using laser welding.

9. The method defined in claim 7, wherein the overlapping step comprising axially aligning the first and second liner parts and fixedly holding the first and second liner parts together, and wherein performing first and second weld seams comprises directing a laser beam onto the overlapping zone while the first and second parts are rotated together about a central axis.

10. The method as defined in claim 7, wherein the first liner part is thinner than the second liner part, and wherein performing first and second weld seams comprises directing a laser beam onto the first liner part.

11. The method as defined in claim 7, wherein performing first and second weld seams comprises directing a laser beam calibrated to form narrow weld seam fusion zones having a width ranging from about 0.010" to about 0.050".

12. The method defined in claim 7, comprising: providing a plurality of ventilation holes annularly disposed in one of the linear parts, and wherein performing a first weld seam in the overlapping zone comprises performing the first weld seam at a given distance from the ventilation holes, and further wherein performing a second weld seam in the overlapping zone comprises performing the second weld seam at said given distance from the ventilation holes.

13. The method defined in claim 7, further comprising providing ventilation holes in the thinner one of the first and second liner parts in such a way that the ventilation holes are subsequently in the overlapped zone.

* * * * *